UNITED STATES PATENT OFFICE.

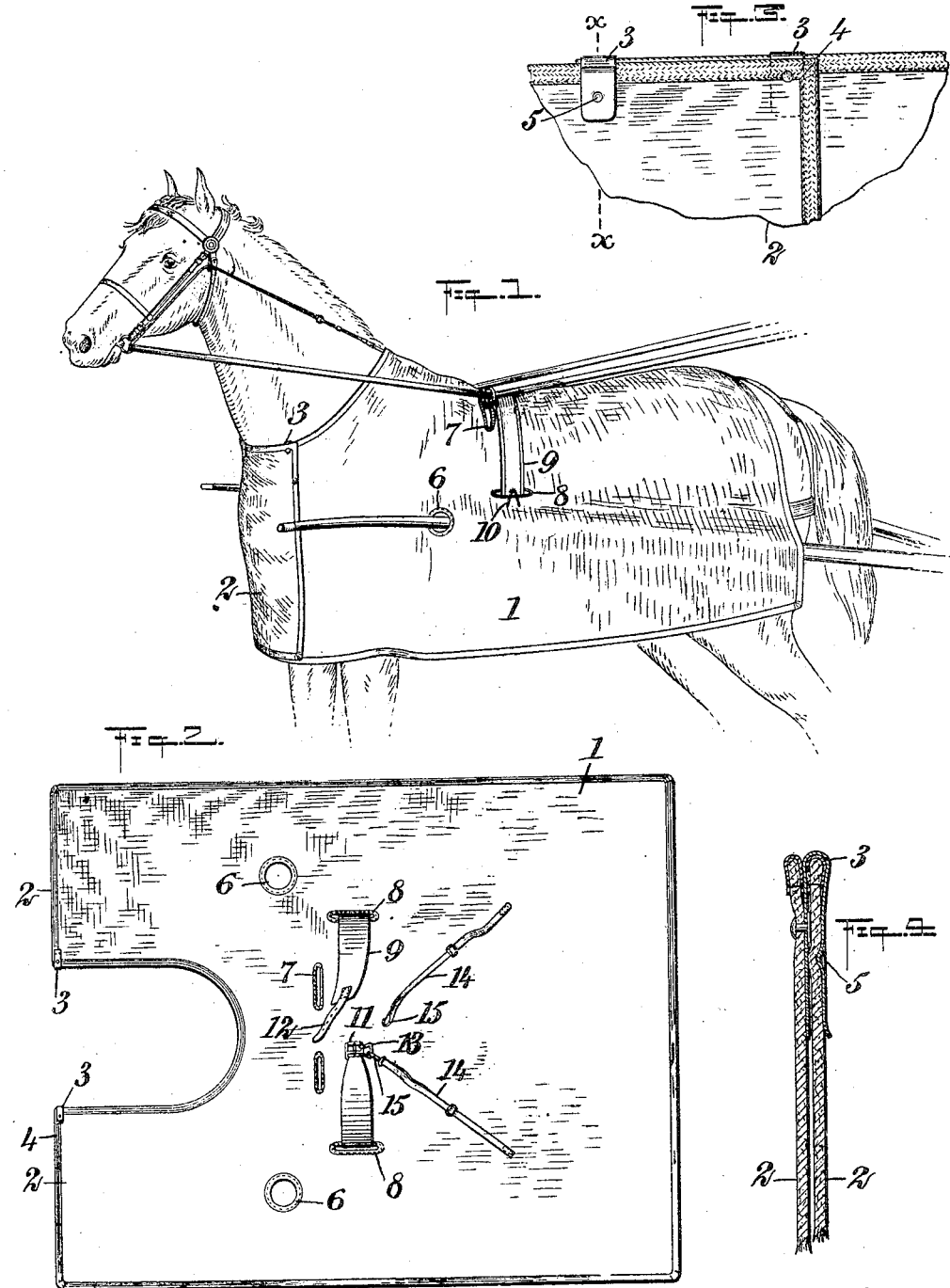

CHRISTOPHER HARLEY CARLI, OF STILLWATER, MINNESOTA.

ANIMAL-BLANKET.

No. 798,320. Specification of Letters Patent. Patented Aug. 29, 1905.

Application filed February 4, 1905. Serial No. 244,165.

*To all whom it may concern:*

Be it known that I, CHRISTOPHER HARLEY CARLI, a citizen of the United States, and a resident of Stillwater, in the county of Washington and State of Minnesota, have invented a new and Improved Animal-Blanket, of which the following is a full, clear, and exact description.

This invention relates particularly to improvements in blankets for horses, the object being to provide a simple means for preventing the blanket from slipping around on the animal when used as either a night or street covering.

Another object is to provide simple devices for securing the front of the blanket over a horse's chest and obviating the employment of the usual straps or buckles.

I will describe an animal-blanket embodying my invention and then point out the novel features in the appended claims.

Reference is to be had to the accompanying drawings, forming a part of this specification, in which similar characters of reference indicate corresponding parts in all the views.

Figure 1 shows a blanket embodying my invention as upon a horse. Fig. 2 is an inside plan view of the blanket. Fig. 3 is a fragmentary view showing the breast-flap fastening, and Fig. 4 is a section on the line x x of Fig. 3.

Referring to the drawings, 1 designates the blanket, having at the front the flaps 2, designed to be folded over the breast or chest of the horse, as indicated in Fig. 1. Attached to each flap is a hook-shaped clip 3, consisting of spring-yielding metal, and the hook portion of the clip on one flap is designed to engage over the other flap, and as the blanket will have a raised binding-strip 4 the said clips cannot be accidentally detached. As a further means of preventing any possible detachment of the clips from the blanket the hook portion of each clip is provided with a depression 5, forming a projection at the inner side which will force itself into the blanket material, as indicated in Fig. 4.

The blanket is provided with openings 6 for the passage therethrough of vehicle-shafts, and it is also provided with openings 7 for receiving the harness-terrets. At opposite sides it is provided with openings 8, through which the surcingle 9 passes. To prevent the surcingle slipping with relation to the blanket, I may employ hook members 10, which are attached to the surcingle and arranged over the lower walls of the openings 8, as shown in Fig. 1. These hook members are adjustable on the surcingle.

On one end of the surcingle is a buckle 11, designed to be engaged with a strap 12 on the other end of the surcingle, and on this buckle 11 is a loop member 13. Attached to the inner side of the blanket rearward of the surcingle-openings are securing-straps 14, which preferably are adjustable as to length, and on these straps are snap-hooks 15, designed to be engaged with the loop 13 when the blanket is placed upon the horse at night or to be engaged with buckles on the holdback of a harness or with any other suitable part of the harness when the blanket is used on the animal during the day-time and in driving.

Having thus described my invention, I claim as new and desire to secure by Letters Patent—

1. An animal-blanket having surcingle-openings, a surcingle, devices on the surcingle to prevent sliding movement thereof with relation to the blanket a buckle on the surcingle, a loop on the buckle, securing-straps attached to the inner side of the blanket rearward of said openings, and hooks on the straps for engaging said loop.

2. An animal-blanket having surcingle-openings, a surcingle, hook members on said surcingle for preventing sliding movement thereof with relation to the blanket, a buckle on said surcingle, a loop on the buckle, adjustable securing-straps fastened to the inner side of the blanket rearward of said openings, and snap-hooks on said straps.

3. An animal-blanket having breast-flaps, and hook-shaped clips on the flaps having projections on the inner side, the clip on one flap being designed to engage over the upper edge of the other flap.

In testimony whereof I have signed my name to this specification in the presence of two subscribing witnesses.

CHRISTOPHER HARLEY CARLI.

Witnesses:
L. B. CASTLE,
GEO. HAYES.